United States Patent

Markow

[15] 3,698,461

[45] Oct. 17, 1972

[54] ELASTIC CONOID SHAPED WHEEL

[72] Inventor: Edward G. Markow, Oakdale, N.Y.

[73] Assignee: Grumman Aerospace Corporation, Bethpage, L.I., N.Y.

[22] Filed: Dec. 18, 1969

[21] Appl. No.: 886,059

[52] U.S. Cl. ........................152/5, 301/41, 180/7
[51] Int. Cl. ....................B60b 3/00, B60b 9/00
[58] Field of Search............152/5, 6, 11, 12, 352 D; 301/43, 63 PW, 41; 180/7

[56] References Cited

UNITED STATES PATENTS

| | | | |
|---|---|---|---|
| 3,234,988 | 2/1966 | Cummings | 152/12 |
| 2,878,074 | 3/1959 | Cawl | 301/63 PW |
| 1,323,687 | 12/1919 | French | 301/43 |
| 2,998,996 | 9/1961 | Aghnides | 152/352 |
| 3,182,705 | 5/1965 | Markow | 152/12 |

OTHER PUBLICATIONS

W. S. Bacon, Science Newsfront, Popular Science Monthly, Dec. 1968, page 18.

*Primary Examiner*—Arthur L. La Point
*Assistant Examiner*—D. W. Keen
*Attorney*—Morgan, Finnegan, Durham & Pine

[57] ABSTRACT

A wheel having a hub connected to a conoidally shaped solid section, the base edge of which is attached to a rim. The wheel is mounted to a vehicle axle by means provided with the hub.

7 Claims, 5 Drawing Figures

PATENTED OCT 17 1972  3,698,461

INVENTOR.
EDWARD G. MARKOW
BY
Morgan, Finnegan, Durham & Pine
ATTORNEYS

ELASTIC CONOID SHAPED WHEEL

BACKGROUND OF THE INVENTION

1. Field of the Invention

This invention relates generally to wheels for vehicles. The wheel of this invention is especially suitable for use on vehicles operating on weak soil and/or in rough terrain and, in particular, for vehicles operating on the lunar surface. The wheel has application in any environment wherein unusual surface conditions require a large ground contact area due to weak soil and attenuated dynamics due to the combination of surface roughness and vehicle speed.

2. Description of the Prior Art

Presently, wheels and tracks are the conventional devices used to provide vehicles with means for locomotion over ground surfaces.

The conventional wheel with simple design exhibits poor performance when required to operate on weak soil and/or in rough terrain. The conventional wheel inherently affords a limited contact area on any surface over which it travels, the contact area being dependent on wheel size. As a result, the size of a conventional wheel necessary for operation on weak soil must be large and, therefore, heavy. The resulting weight and size of the conventional wheel designed to operate on weak soil is a decidedly limiting factor on the speed, stability and control of the vehicle in rough terrain.

One solution of the problem of locomotion on weak soil and/or in rough terrain has been to provide vehicles with large tracks rather than wheels. Typically, such tracks are comprised of a continuous loop of articulated sections arranged on a plurality of wheels to provide a continuous rolling surface. This design necessarily sacrifices the simplicity of the wheel since it requires the use of a heavy structure and complex mechanical linkages which are vulnerable to jamming as the result of an accumulation of soil and other debris. Furthermore, locomotion energy demands are higher and speeds are severely limited as a result of the energy dissipated in the numerous journal bearings and the centrifugal or dynamic forces which increase with speed.

A major problem whether wheels or tracks are used is the sprung to unsprung weight ratio of the vehicle. In general, an increase in this ratio enhances the stability and control of the vehicle in rough terrain thereby allowing higher operating speeds. With presently known locomotion devices, vehicles must be provided with complex suspension designs in order to attain suitable performance under these conditions.

There is, therefore, a need in the art for a wheel which will provide a greater ground contact area than a conventional wheel and also provide acceptable dynamic behavior at minimal energy expenditure.

SUMMARY OF THE INVENTION

It is an object of the present invention to provide a wheel having a large ground contact area and enhanced ride dynamics at high speed on rough terrain.

It is another object of the present invention to provide a wheel which is simple in construction, economical to fabricate and operate, and capable of withstanding adequate fatigue and impact loads compatible with off-road vehicle operations.

It is another object of the present invention to provide a wheel particularly suitable for operation on the lunar surface.

It is yet another object of the present invention to provide a locomotion device which does not become jammed with loose soil, vegetation or debris during operation.

The wheel of the present invention is provided with a hub attached to a flexible conoidally shaped section having a flexible cylindrically shaped rim attached at its base. The specific shape of the conoidal section, whether ellipsoidal, hemispherical, conical or otherwise, depends on the spring rate and deformation characteristics desired. The wheel is basically designed with an axle mount at the hub and a conoidally shaped section extending from the hub to the rim section. The rim section at the base of the conoidal section provides both a rolling surface for the wheel and means to stabilize the conoidal section at the point of contact with the ground. In addition, a wearing surface is provided on the surface of the rim section to afford durability and increased traction at the wheel rolling surface.

Means are provided such that when the wheel is mounted and deflected due to the load imposed on it the ground contact is aligned with the direction of movement of the wheel, thereby eliminating the inefficiency of lateral scuffing components. One method for achieving this is to cant the wheel axle downwardly toward the horizontal surface the precise angle dependent on wheel geometry, operating loads and structural properties of the construction material. Another method for achieving this result is to provide flexible material between the inside surface of the conoidally shaped section and the cylindrical rim section.

A very small portion of the conoidal wheel, according to the present invention, is unsprung while the remainder of the wheel and the mass it carries is sprung. The portion of the wheel which is unsprung is that portion in the vicinity of ground contact. Thus, the sprung to unsprung vehicle weight ratio is large which is a desirable characteristic for vehicles operating in rough terrain at high speeds.

DESCRIPTION OF THE DRAWINGS

The present invention will be described and understood more readily when considered with the attached drawing in which:

FIG. 3a is a partial section of the wheel of FIG. 3 taken along line 3a—3a; and

FIG. 4 is a front elevational view of another embodiment of the wheel of the present invention.

DESCRIPTION OF THE PREFERRED EMBODIMENT

Figure 1:
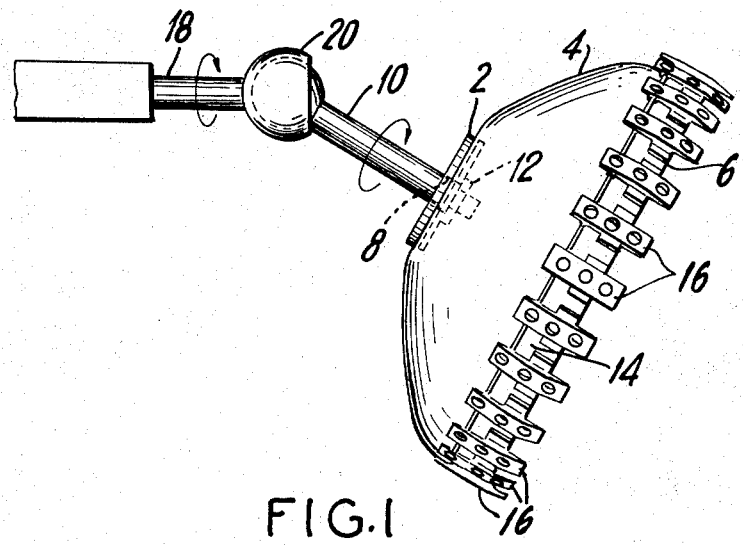
FIG. 1 is a front elevational view of the wheel of the present invention, including the mounting means therefor.
Figure 2:
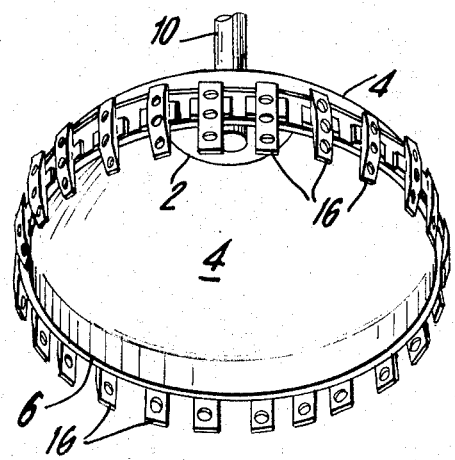
FIG. 2 is a side elevational view of the wheel of the present invention in the unloaded state.

The wheel of the present invention, as can be readily seen in FIG. 1, basically comprises a hub 2, a conoidally shaped solid section 4 and a rim section 6. The hub 2 is located at the apex of the conoidal section 4 and includes an opening 8 through which an axle 10 can pass. Means 12 are provided with the hub 2 for attachment to axle 10 which may be a simple bolt-on arrangement. The conoidal body section 4 extends from the hub 2 and its base is connected to the rim 6. Although the rim section 6 may have any form, so long as a rolling surface is provided, the form depicted and described herein is cylindrical. The cylindrical rim section 6 extends from the circumference of the base of the conoidal body section 4. The outer surface 14 of the cylindrical rim section is designed to serve as the rolling surface for the wheel. To increase durability and traction, a wearing surface is attached to the rolling surface 14 of the cylindrical rim section. As best seen in FIGS. 1 and 2, the wearing surface provided is cleats 16 although any suitable surface may be provided. One such suitable substitute for the cleats could be a low profile pneumatic belt type tyre.

Materials that are applicable for use in the conoidal body section 4 are metals, reinforced plastics, plastics and composites. The specific material used depends upon the design considerations of proper deflection characteristics for the load and retention of useful fatigue life properties. In practice, it has been found that fiber-glass reinforced plastic is a particularly suitable material for use on soil having the consistency of the moon's surface. The precise conoidal shape, i.e., ellipsoidal, hemispherical, or otherwise, of the conoidal body section 4, is dependent on the spring rate and deformation characteristics desired.

The cylindrical section or extension 6, which acts as the rim of the wheel, may be integrally formed with the conoidal body section or it may be formed as a discrete section of differing material. However, practice has taught that the most effective and practical composite conoidal wheel is one wherein the conoidal body section 4 and cylindrical rim section 6 are integrally formed.

The wearing surface attached to the outer surface 14 of cylindrical rim 6 is to enhance the wear and traction of the wheel. As embodied, cleats 16 fixed to the outer surface of the cylindrical rim serve particularly well to enhance wear and provide traction in weak soil. A low profile pneumatic belt type tyre may also be used in place of the cleats to provide traction in weak soil. The cleats 16 or any other wearing surface may be formed of any wear resistant material. However, practice has shown that the most suitable cleat material is titanium because of its wear resistance and high strength to weight ratio for a wide range of thermal environments.

Figure 3:
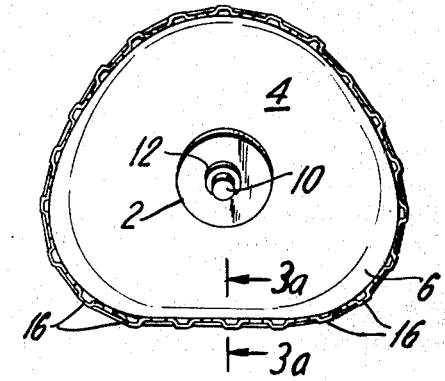
FIG. 3 is a side elevational view of the wheel of the present invention in the loaded state.
Figures 3A, 4:
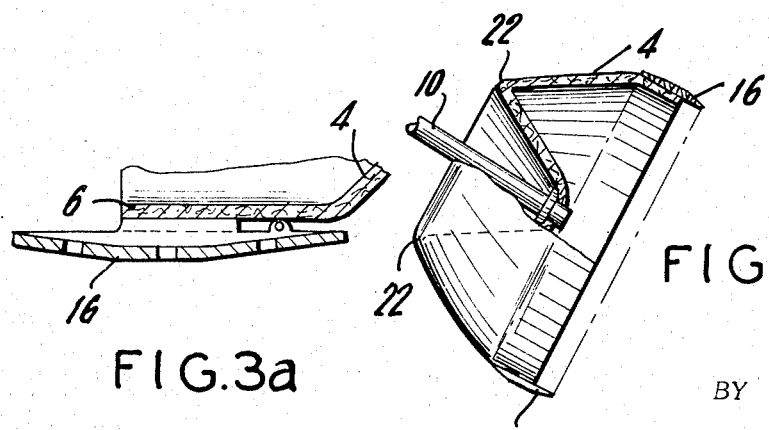

Means must also be provided for maintaining the ground contact of rolling surface 14 in alignment with the direction of movement of the wheel. For accomplishing this, a wheel mounting arrangement which cants the wheel at about a 15° angle from the horizontal as can be seen in FIGS. 1 and 2 provides a ground contact with good pressure distribution and minimal lateral scuffing as seen in FIG. 3a. Referring to FIG. 1, the axle 10 is canted from the horizontal plane of the ground surface and is connected to drive shaft 18 by means of a universal coupling 20. The hub 2 of the wheel is mounted to axle 10 thereby canting the wheel at the same angle as axle 10. If this were not done, the loaded wheel as shown in FIG. 3 would produce lateral scuffing components because a portion of the conoidal body section 4 between hub 2 and the cylindrical rim portion 6 would come into contact with the ground surface. This produces a poor ground contact pressure distribution and wastes energy due to scuffing components associated with the ground contact. Another method of alleviating this condition, other than canting the wheel, is by providing flexing elements, i.e., rubber or metal, between the inside surface of conoidal body section 4 and the inside surface of cylindrical rim section 6.

Another embodiment of the present invention is depicted in FIG. 4. In this embodiment the conoidally shaped body section 4 is reversed at point 22 of its circumference. The embodiment in FIG. 4 has all the same characteristics as the wheel previously described and, in addition, is smaller in width.

In operation, when the wheel is loaded, it becomes compressed and distorted as seen in FIGS. 3 and 3a. The distortion in the vicinity of ground contact accounts for the track like behavior of the wheel. Due to the canting of the wheel with respect to the ground surface, the rolling surface of the rim lies flat on the ground surface. The wheel is designed to operate in a low stress range under load thereby insuring long operational life.

One of the important features of this wheel is that a very small portion of the wheel is unsprung. This feature of the wheel insures greater stability, control and ride comfort while negotiating rough textured surfaces at high speeds. In addition, the wheel acts almost like a perfect spring contributing a minimal energy loss due to flexure. This flexural property is unique in that the wheel is supple for vertical dynamic and fore and aft impact loads but very stiff for side loads required for turn and side slope stability. In other words, the wheel inherently possesses a high steering authority. Additionally, the shell structure or conoidal body section is a very efficient means to transmit torque loads from the axle to ground contact.

It is understood that the foregoing general and detailed descriptions are exemplary and explanatory of the present invention and are not to be interpreted as restrictive of the scope of the following claims.

What is claimed is:

1. A wheel for a vehicle travelling on a ground surface and having an axle which comprises a hub, a resilient conoidally shaped body section extending from said hub and having a base, a resilient rim attached to the base of said conoidally shaped body section, a rolling surface associated with said rim, means for mounting the wheel to a vehicle axle and a flexible element between the inside surface of the conoidally shaped body section and the inside surface of the rim for maintaining the ground contact in alignment with the direction of movement of the wheel whereby lateral scuffing components are eliminated.

2. The wheel as defined in claim 1 which further comprises a wearing surface attached to said rolling surface to provide wear resistance and traction for the wheel.

3. The wheel as defined in claim 2 wherein said rim is in the form of a cylindrical section.

4. The wheel as defined in claim 2 wherein the wearing surface consists of an arrangement of cleats attached to said rolling surface of said rim.

5. The wheel as defined in claim 4 wherein said conoidally shaped body section and said rim are made of a fiber-glass reinforced plastic material.

6. The wheel as defined in claim 5 wherein the cleats are made of titanium metal.

* * * * *